United States Patent
Liu et al.

(10) Patent No.: US 9,204,248 B2
(45) Date of Patent: Dec. 1, 2015

(54) COMMUNICATION TERMINAL AND INFORMATION TRANSMISSION PROCESSING METHOD THEREFOR

(75) Inventors: Yong Liu, Beijing (CN); Chunyu Song, Beijing (CN)

(73) Assignees: Lenovo (Beijing) Limited, Beijing (CN); Beijing Lenovo Software Ltd., Beijing (CN)

( * ) Notice: Subject to any disclaimer, the term of this patent is extended or adjusted under 35 U.S.C. 154(b) by 0 days.

(21) Appl. No.: 13/819,442

(22) PCT Filed: Aug. 22, 2011

(86) PCT No.: PCT/CN2011/078688
§ 371 (c)(1),
(2), (4) Date: Feb. 27, 2013

(87) PCT Pub. No.: WO2012/025036
PCT Pub. Date: Mar. 1, 2012

(65) Prior Publication Data
US 2013/0165156 A1  Jun. 27, 2013

(30) Foreign Application Priority Data

Aug. 27, 2010  (CN) .......................... 2010 1 0266163

(51) Int. Cl.
H04W 4/02  (2009.01)
(52) U.S. Cl.
CPC ................ *H04W 4/02* (2013.01); *H04W 4/023* (2013.01)
(58) Field of Classification Search
USPC ........... 455/518–519, 550.1, 456.1–457, 466; 370/254
See application file for complete search history.

(56) References Cited

U.S. PATENT DOCUMENTS 6,718,014 B2   4/2004  Haim
7,458,184 B2 * 12/2008  Lohtia ........................ 455/456.3
(Continued)

FOREIGN PATENT DOCUMENTS

CN       201138849 Y    10/2008
CN       101345769 A     1/2009
(Continued)

OTHER PUBLICATIONS

International Search Report mailed Dec. 1, 2011 in corresponding PCT Application No. PCT/CN2011/078688.

*Primary Examiner* — Nathan Taylor
(74) *Attorney, Agent, or Firm* — Kinney & Lange, P.A.

(57) ABSTRACT

Provided in the present invention are a communication terminal and an information transmission processing method therefor. The communication terminal comprises: a communication processing module (6); a location information acquisition module (1), configured to acquire location information of users of a first user set; a target location acquisition module (2), configured to acquire a target location; a filter module (3), configured to filter a second user set from the first user set on the basis of the location information of the users of the first user set and the target location; a content acquisition module (4), configured to acquire content to be transmitted; an information transmission module (5), configured to transmit the content to be transmitted to each of users of the second user set via the communication processing module (6). According to the present invention, the amount of user input is reduced, and it thus increases efficiency of information transmission greatly, particularly when the number of target users is relatively large.

13 Claims, 2 Drawing Sheets

(56) References Cited

U.S. PATENT DOCUMENTS

| | | | |
|---|---|---|---|
| 8,032,162 B2* | 10/2011 | Kim et al. | 455/466 |
| 2003/0004743 A1* | 1/2003 | Callegari | 705/1 |
| 2005/0113123 A1* | 5/2005 | Torvinen | 455/519 |
| 2005/0170856 A1* | 8/2005 | Keyani et al. | 455/466 |
| 2005/0221807 A1* | 10/2005 | Karlsson et al. | 455/418 |
| 2005/0245241 A1* | 11/2005 | Durand et al. | 455/414.1 |
| 2006/0022048 A1* | 2/2006 | Johnson | 235/462.1 |
| 2006/0026147 A1* | 2/2006 | Cone et al. | 707/3 |
| 2007/0135136 A1* | 6/2007 | Ische | 455/456.1 |
| 2007/0281689 A1* | 12/2007 | Altman et al. | 455/435.1 |
| 2007/0290787 A1* | 12/2007 | Fiatal et al. | 340/2.1 |
| 2008/0014971 A1* | 1/2008 | Morin et al. | 455/466 |
| 2008/0057987 A1* | 3/2008 | Landschaft et al. | 455/466 |
| 2008/0319650 A1* | 12/2008 | Aaltonen et al. | 701/207 |
| 2009/0044246 A1* | 2/2009 | Sheehan et al. | 725/146 |
| 2009/0215486 A1* | 8/2009 | Batni et al. | 455/550.1 |
| 2009/0233543 A1* | 9/2009 | Watson et al. | 455/3.06 |
| 2009/0313325 A1* | 12/2009 | Vanecek et al. | 709/203 |
| 2010/0070758 A1* | 3/2010 | Low et al. | 713/155 |
| 2010/0246789 A1* | 9/2010 | Vance et al. | 379/201.01 |
| 2010/0273464 A1* | 10/2010 | Radlinger | 455/414.2 |
| 2011/0047511 A1* | 2/2011 | Essl et al. | 715/836 |
| 2011/0092227 A1* | 4/2011 | Phukan | 455/456.3 |
| 2011/0103302 A1* | 5/2011 | Hall | 370/328 |
| 2012/0008526 A1* | 1/2012 | Borghei | 370/254 |
| 2013/0165156 A1* | 6/2013 | Liu et al. | 455/456.3 |

FOREIGN PATENT DOCUMENTS

| | | |
|---|---|---|
| CN | 101720055 A | 6/2010 |
| CN | 101742639 A | 6/2010 |
| WO | 2010092484 A2 | 8/2010 |

\* cited by examiner

COMMUNICATION TERMINAL AND INFORMATION TRANSMISSION PROCESSING METHOD THEREFOR

FIELD OF THE INVENTION

The present invention relates to communication technologies, and in particular, to a communication terminal and an information transmission processing method therefor, for improving efficiency of information transmission.

BACKGROUND OF THE INVENTION

Currently, all communication terminals can transmit information to a specific object. However, when the existing communication terminals are transmitting information, all of them have drawbacks of inflexibility and low efficiency in information transmission, as described below.

If a user wants to transmit same information to a plurality of users simultaneously, there are only two solutions. One solution is to select the users manually and one by one and then perform a group transmission. Obviously, the efficiency of such a solution is low, especially in a case where the number of users to whom the information needs to be transmitted is large.

The other solution is to perform a grouping operation, in advance, which groups contacts into groups, and then select a specific group to transmit. At this time, the information can be transmitted to each person in the group. However, it can be found that such a solution is very inflexible. When the users to whom the information needs to be transmitted belong to different groups and there are some other users in these groups to whom the information does not need to be transmitted, the user still has to perform the selection manually. Therefore, the scope of applications of this solution, in which group transmission is performed for a group, is very limited, and in more other scenarios, their efficiencies are very low.

SUMMARY OF THE INVENTION

The object of the present invention is to provide a communication terminal and an information transmission processing method therefor, so as to improve the efficiency of the information transmission processing for the communication terminals.

To achieve the above object, the embodiments of the present invention provide a communication terminal, comprising:
  a communication processing module;
  a location information acquisition module configured to acquire location information of users of a first user set;
  a target location acquisition module configured to acquire a target location;
  a filter module configured to filter a second user set from the first user set on the basis of the location information of the users of the first user set and the target location;
  a content acquisition module configured to acquire content to be transmitted; and
  an information transmission module configured to transmit the content to be transmitted to each of users of the second user set via the communication processing module.

The communication terminal described above further comprises:
  an electronic map presenting module configured to present an electronic map,
  wherein the target location acquisition module is further configured to determine the target location on the basis of operations on the electronic map.

The communication terminal described above further comprises:
  an electronic map storage module configured to store an electronic map; and
  an original location acquisition module configured to acquire original location information,
  wherein the target location acquisition module is further configured to determine the target location by searching in the electronic map on the basis of the original location information.

The communication terminal described above further comprises:
  an electronic map storage module configured to store an electronic map,
  wherein the target location acquisition module is further configured to determine the target location by searching in the electronic map on the basis of the content to be transmitted.

According to the communication terminal described above, the target location is an expected area, and location information of users of the second user set indicates that the users of the second user set are located within the expected area.

According to the communication terminal described above, the target location is an expected area, and location information of users of the second user set indicates that the users of the second user set are located outside of the expected area.

According to the communication terminal described above, the information transmission module comprises:
  a short message processing module configured to enclose the content to be transmitted into a short message, and transmit the short message to each of users of the second user set via the communication processing module; or
  an instant message processing module configured to enclose the content to be transmitted into an instant message for an instant messenger, and transmit the instant message to each of users of the second user set via the communication processing module.

According to the communication terminal described above, the filter module comprises:
  a first filter unit configured to filter a third user set from the first user set, wherein locations of users of the third user set and the target location have a predetermined location filter relation;
  a second filter unit configured to filter the second user set from the third user set on the basis of auxiliary filter information of the users of the third user set which is different from the location information, wherein the auxiliary filter information of the users of the second user set meets a predetermined auxiliary filter condition.

To achieve the above object, the embodiments of the present invention also provide an information transmission processing method for a communication terminal, comprising:
  acquiring location information of users of a first user set and a target location;
  filtering a second user set from the first user set on the basis of the location information of the users of the first user set and the target location; and
  transmitting content to be transmitted to each of users of the second user set after the content to be transmitted is acquired.

According to the information transmission processing method described above, the target location is determined on the basis of operations on an electronic map stored in the communication terminal.

According to the information transmission processing method described above, the target location is acquired by searching in an electronic map stored in the communication terminal on the basis of input original location information.

According to the information transmission processing method described above, the target location is acquired by searching in an electronic map stored in the communication terminal on the basis of the content to be transmitted.

According to the information transmission processing method described above, the step of filtering a second user set from the first user set on the basis of the location information of the users of the first user set and the target location comprises steps of:

filtering a third user set from the first user set, wherein locations of users of the third user set and the target location have a predetermined location filter relation;
  filtering the second user set from the third user set on the basis of auxiliary filter information of the users of the third user set which is different from the location information, wherein the auxiliary filter information of the users of the second user set meets a predetermined auxiliary filter condition.

The embodiments of the present invention have advantageous effects as follows.

In the embodiments of the present invention, after location information of users of a first user set and a target location are acquired, a filter module filters a second user set from the first user set automatically on the basis of the location information of the users of the first user set and the target location. Then, content to be transmitted is transmitted to each of users of the second user set via a communication processing module. Because the user only needs to determine a target location during the above operations in order to determine the target users to whom the information is transmitted, and in some cases, the user even does not need to determine the target location in order to determine the target users to whom the information is transmitted, the amount of input operations of users is reduced as compared with the prior art, in which the user needs to select the target users manually. Especially in a case where the number of the target users is large, such a solution improves the efficiency of information transmission greatly.

In the embodiments of the present invention, users who meet requirements are further selected on the basis of additional auxiliary filter information, and the transmission amount of useless information is reduced.

The solutions of the embodiments of the present invention represent a new concept of the location-based service. They consider the location information as conditions rather than results, and go beyond the basic location services, such as, the GPS navigation and the map locating. Furthermore, the dynamic filtering of information recipients results in a more flexible, convenient, intelligent transmission of information. It is a new location-based service.

DETAILED DESCRIPTION OF PREFERRED EMBODIMENTS

In a communication terminal according to an embodiment of the present invention, users who do not meet conditions are deleted from a user set automatically on the basis of location information, and then information is transmitted to remaining (selected) users. This improves efficiency of information transmission.

Figure 1:
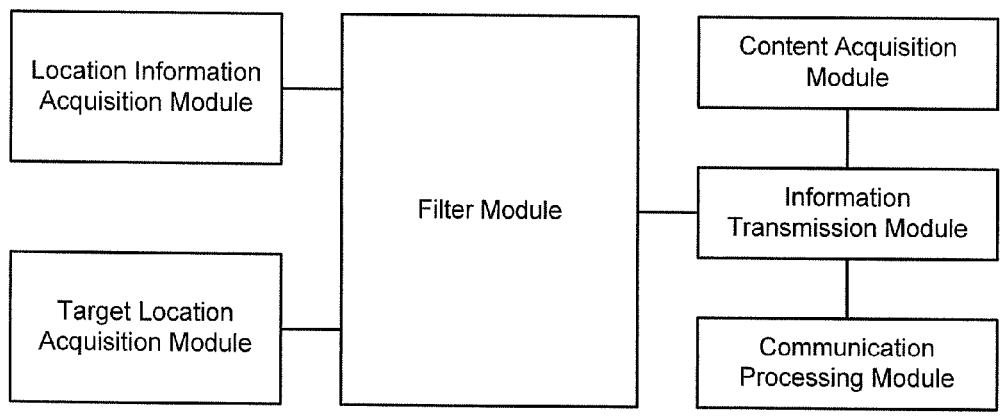
FIG. 1 is a schematic diagram illustrating a structure of a communication terminal according to an embodiment of the present invention.

FIG. 1 shows a communication terminal according to an embodiment of the present invention, comprising:
  a communication processing module;
  a location information acquisition module configured to acquire location information of users of a first user set;
  a target location acquisition module configured to acquire a target location;
  a filter module configured to filter a second user set from the first user set on the basis of the location information of the users of the first user set and the target location;
  a content acquisition module configured to acquire content to be transmitted; and
  an information transmission module configured to transmit the content to be transmitted to each of users of the second user set via the communication processing module.

In a specific embodiment of the present invention, location information of users of a first user set is needed to be acquired at first, where the first user set may be:
  a set consisting of contacts in a contact book of a mobile communication terminal (such as, a mobile phone, a PDA, etc.); or
  a set consisting of buddies in an instant messenger on a mobile terminal; or
  a set consisting of buddies in Social Networking Service (SNS).

Of course, the above are illustrative exemplifications only. The above mentioned first user set may comprise contacts/buddies in other forms, and will not be detailed herein.

It should be understand that although the term "user" is used in the description hereinbefore and hereinafter, the "user" is embodied by a terminal. In other words, the subsequent steps of "acquiring location information of the users", "transmitting to the users" . . . are practically carried out by the terminal which embodies the user.

After the first user set is determined, the location information of the users is needed to be acquired. In a specific embodiment of the present invention, the location information of the users can be acquired in a plurality of modes, which will be illustrated below.

<Location Information Acquisition Mode 1>

In the location information acquisition mode 1, for a fixed terminal (such as, a desktop computer), its location information can be determined by the public IP address used by the fixed terminal.

For example, the location of a fixed terminal with a public IP address of 202.119.0.1 is "Nanjing city, Jiangsu Province", and a public IP address of 12.130.132.30 indicates that a corresponding fixed terminal is located in the United States.

<Location Information Acquisition Mode 2>

In the location information acquisition mode 2, location information can be determined by a GPS module configured in a peer communication terminal.

A main function of a GPS signal receiver configured in a communication terminal is to capture satellites to be measured at certain satellite mask angles and to track the operations of these satellites. After the receiver captures signals from the tracked satellites, change rates of pseudo-distance and distance from the receiving antenna to the satellite can be measured, and orbit parameters of the satellite can be demodulated. Based on these data, the micro processing computer in the receiver may perform a locating calculation according to a locating solving method to calculate the location information of the geographical location where the user is located, such as, longitude/latitude, altitude, etc.

A communication terminal according to an embodiment of the present invention may transmit a location information acquisition request to a communication terminal equipped with a locating module via a fixed/mobile network. The communication terminal equipped with the locating module may initiate the locating module to acquire the location information after receiving this location information acquisition request, and then return the location information acquired by the locating module to the communication terminal according to the embodiment of the present invention by a location information acquisition request response.

<Location Information Acquisition Mode 3>

In the location information acquisition mode 3, the location information of the mobile communication terminal can be acquired via a locating server.

LBS (Location Based Services), also referred as locating services, is a value-added service which is provided by combining the mobile communication network and the satellite positioning system. Location information (such as, coordinate data of longitude/latitude) of a mobile terminal is acquired by a set of locating technologies, and provided to the user of the mobile terminal himself/herself or someone else and the communication system, so as to achieve various location-related services.

With respect to the location service definitions, the wireless E911 (version 2) provides several methods as follows:

the AOA (Angle of Arrival) method, in which location of a mobile communication terminal is acquired by the intersection of base stations;

the TDOA (Time Difference of Arrival) method, in which location is acquired by time difference of interactions between a mobile station and a plurality of base stations;

the Location Marking method, in which location is acquired by identifying each location zone; and the Satellite Locating method.

In the above methods, some processing is performed at the terminal while some processing is perform at the server, and the final result can always be acquired from the locating server which provides a locating service.

With regard to how to interact with a locating server so as to acquire the location information of a mobile communication terminal, it is prior art in the field of the locating technologies, and description thereof will be omitted herein.

Of course, with respect to the fixed terminal, the location information of the fixed terminal can be acquired from a similar server, and further description thereof will be omitted herein.

In a specific embodiment of the present invention, a target location also needs to be acquired. The target location may be an expected point or an expected area. The acquisition of the target location can be achieved in a plurality of modes, which will be illustrated below.

<Target Location Acquisition Mode 1>

In the target location acquisition mode 1, the target location may be determined on the basis of operations of users on an electric map.

In the target location acquisition mode 1, the communication terminal further comprises an electric map presenting module configured to present the electric map;

The target location acquisition module is further configured to determine the target location on the basis of operations on the electric map.

The details are described below.

Figure 2A:
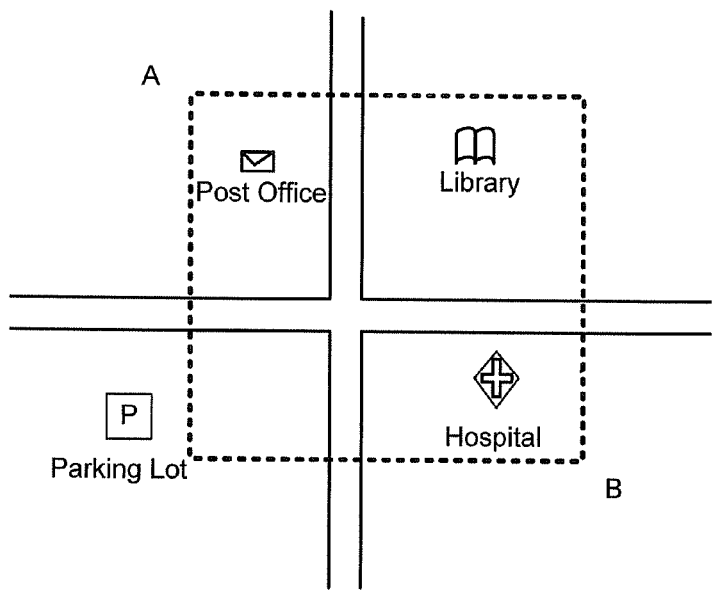
FIG. 2A-FIG. 2B are schematic diagrams showing two possible cases, respectively, in the target location acquisition mode 1 according to an embodiment of the present invention.
Figure 2B:
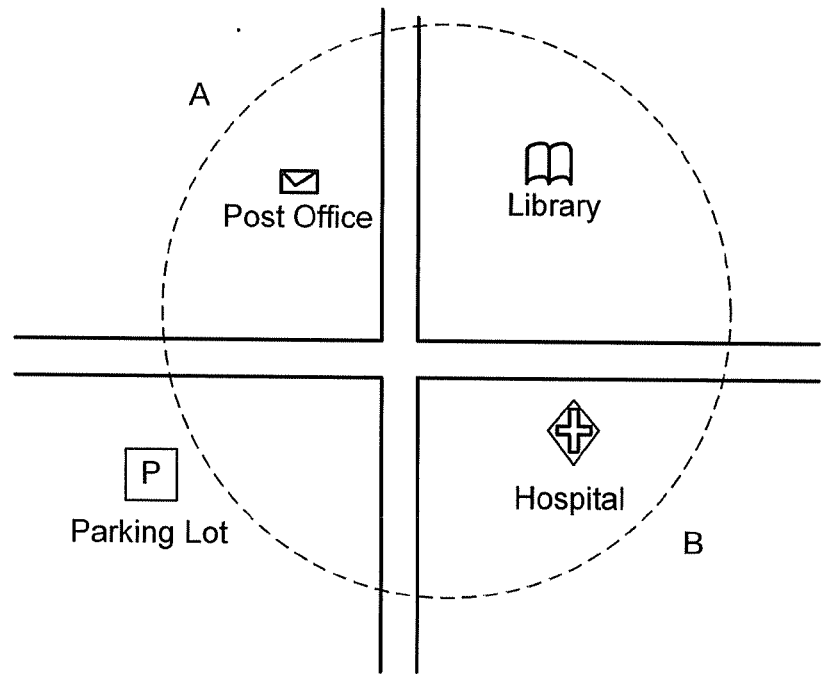

An electric map may usually provide a user with operations to select a target point or a target area. Therefore, in a specific embodiment of the present invention, the target location may be determined on the basis of the operations of the user on the electric map. For example, the user performs a clicking operation at point A on the electric map to read the location of the point A from the electric map as the target location. Furthermore, a dragging operation performed on the electric map by the user, i.e. a cursor is dragged from point A to point B, as shown in FIG. 2A, may determine the area covered by the rectangle box between the point A and the point B as the target location. As shown in FIG. 2B, the area covered by the circle between the point A and the point B may be determined as the target location.

<Target Location Acquisition Mode 2>

In the target location acquisition mode 2, the target location may be determined by searching in the electric map on the basis of the original location information input by the user.

In the target location acquisition mode 2, the communication terminal further comprises:

an electric map storage module configured to store an electric map;

an original location acquisition module configured to acquire original location information;

the target location acquisition module is further configured to determine the target location by searching in the electric map on the basis of the original location information.

The details are described below.

In general, in the existing electric maps, a search may be performed in the electric maps on the basis of the original location information, such as, a certain building, input by the user, and the location corresponding to the original location information can be determined. Therefore, after the user inputs the original location information, the target location acquisition module may search for the geographical location corresponding to the original location information in the electric map, and regards the acquired geographical location as the target location.

For example, given that the user inputs "a building A", the location of the building A may be acquired by searching in the electric map. As another example, given that the user inputs "the Haidian District", the area covered by the Haidian District may be acquired by searching in the electric map. The acquired location may serve as the target locations.

<Target Location Acquisition Mode 3>

In the target location acquisition mode 3, the target location may be determined by searching in the electric map on the basis of the content to be transmitted.

In the target location acquisition mode 3, the communication terminal further comprises:

an electric map storage module configured to store an electric map;

the target location acquisition module is further configured to determine the target location by searching in the electric map on the basis of the content to be transmitted.

The details are described below.

Given that the content to be transmitted comprises a location, the target location acquisition module extracts this location from the content to be transmitted, uses this location to search in the electric map, and regards the found location information of the location as the target location. Examples are given below.

Given that the content to be transmitted is read as "for all colleagues who work in the Zhongguancun Science & Technology Park today, please send your summary report to A's email address". In this case, the location "Zhongguancun Science & Technology Park" can be extracted therefrom by a word segmentation technique, and then the location information of "Zhongguancun Science & Technology Park" can be searched in the electric map as the target location.

<Target Location Acquisition Mode 4>

In the target location acquisition mode 4, the current location of the user may be regarded as the target location.

The manner in which the location of the communication terminal per se is acquired is already described hereinbefore. For different terminals, the locations may be acquired by a GPS module or from a locating server, and of course, the locations may also be determined on the basis of the IP addresses. For simplicity, description thereof is omitted.

After the location information of the users of the first user set and the target location are acquired, it is needed to filter a second user set from the first user set on the basis of the location information of the users and the target location. In a specific embodiment of the present invention, the second user set can be filtered from the first user set on the basis of the relative relation between the current location of the users and the target location. Possible cases are described below.

Case I

The target location is a location point. At this time, the filter module may delete users, the distance between whose current location and the target location is greater than a predetermined value, from the first user set, and obtain the second user set.

Case II

The target location is a location point. At this time, the filter module may delete users, the distance between whose current location and the target location is smaller than a predetermined value, from the first user set, and obtain the second user set.

Case III

The target location is an area. At this time, the filter module may delete users, whose current location is within the area, from the first user set, and obtain the second user set.

Case IV

The target location is an area. At this time, the filter module may delete users, whose current location is outside of the area, from the first user set, and obtain the second user set.

The cases I and III show that the target users of the content to be transmitted are located within the area. For example, if a user wants to inform his classmates of his coming tour to the Cheng Du city, he/she may select the target location as the Cheng Du city in any of the above various modes, then select the users, whose current locations are within the area covered by the Cheng Du city, as users of the second user set, and transmit a message "I will visit the Cheng Du city in August, 2010" to the users of the second user set.

For the cases I and III, another example is given below. For example, a user wants to invite people, who are familiar to him, to have a lunch at noon. However, in view of works in the afternoon, people to be invited shall be limited within a certain range. At this time, the target location is selected as the current location of the user in any of the above various modes, and a distance parameter is set as 300 meters. The filter module will then select users, whose current locations are less than or equal to 300 meters away from the current location of the user, as users of the second user set, and transmit a message "let's have a lunch in the Restaurant AA at this noon" to the users of the second user set.

Of course, the user may also select the location of the Restaurant AA as the target location. In such case, the filter module will select users, whose current locations are less than or equal to 300 meters away from the Restaurant AA, as users of the second user set, and transmit a message "let's have a lunch in the Restaurant AA at this noon" to the users of the second user set.

The cases II and IV show that messages will not be transmitted to people within a certain area when the user is group-transmitting the message. For example, if a user, who is currently located in the Beijing city and wants to travel to different places, does not know the weathers of these places, he/she may query his/her classmates around the country about the weather conditions. At this time, the target location may be selected as the Beijing city in any of the above various modes. Users, whose current locations are outside of the area covered by the Beijing city, are selected from the first user set as users of the second user set, and a message "how is the weather in your place" is transmitted to the users in the second user set.

For the cases II and IV, another example is given below. For example, the current time is 4 o'clock, and a user to be off duty wants to determine a route for going back home. At this time, it is obvious that another user, whose current location is less than a certain distance (for example, 200 m) away from the current location of the user, is unable to provide the above information. The target location then can be selected as the current location of the user in any of the above various modes. Users, whose current locations are greater than or equal to 500 m away from the current location of the user, are selected from the first user set as users of the second user set, and a message "Where are you? Is there a traffic jam?" is transmitted to the users of the second user set.

In a specific embodiment of the present invention, the above solutions may use any possible messaging processing, such as, short message transmission, instant message transmission, etc. Therefore, in the embodiments of the present invention, the above message transmission module may comprise:

a short message processing module configured to enclose the content to be transmitted into a short message, and transmit the short message to each of users of the second user set via the communication processing module; or an instant message processing module configured to enclose the content to be transmitted into an instant message for an instant messenger, and transmit the instant message to each of users of the second user set via the communication processing module.

With regard to how to enclose and transmit, they are prior art, and will not be described in detail in specific embodiments of the present invention.

In an embodiment of the present invention, after the location information of the users of the first user set and the target location are acquired, the filter module filters a second user set from the first user set automatically on the basis of the location information of the users of the first user set and the target location. Then the content to be transmitted is transmitted to each of users of the second user set via the communication processing module. Because the user only needs to determine a target location during the above operations in order to determine the target users to whom the information is transmitted, and in some cases, the user even does not need to determine the target location in order to determine the target users to whom the information is transmitted, the amount of input operations of users is reduced as compared with the prior art, in which the user needs to select the target users manually. Especially in a case where the number of the target users is large, such a solution improves efficiency of information transmission greatly.

In a specific embodiment of the present invention, the second user set is filtered directly on the basis of relation between the current locations of the users of the first user set and the target location. However, the above method can be further optimized to reduce the transmission amount of useless information. In this manner, the filter module comprises, in particular:

a first filter unit configured to filter a third user set from the first user set, wherein location of users of the third user set and the target location have a predetermined location filter relation;

a second filter unit configured to filter the second user set from the third user set on the basis of auxiliary filter information of the users of the third user set which is different from the location information, wherein the auxiliary filter information of the users of the second user set meets a predetermined auxiliary filter condition.

In a specific embodiment of the present invention, a predetermined location filter relation may be any one of the above cases I-IV. This auxiliary filter information may be: presence information of a user, property information of a user, capability information of a terminal currently used by a user, a scenario mode of a terminal currently used by a user, a motion status of a mobile terminal currently used by a user, etc. Accordingly, the predetermined auxiliary filter condition is a condition that the auxiliary filter information should meet. Various examples are given below.

For the instant messaging, the second filter unit may delete users who are currently offline from the third user set on the basis of the presence of the users, obtain the final, second user set, and transmit the content to be transmitted to the second user set.

Given that the content to be transmitted is a URL link, since not all terminals have the ability to access the network, the second filter unit may delete users whose terminals cannot access the network from the third user set on the basis of the capability information of the terminals currently used by the users, obtain the final, second user set, and transmit the URL link to the second user set.

In the above process, the terminal capability information may be acquired by sending a terminal capability information request to the terminal and receiving the terminal capability information returned by the terminal.

Given that a user wants to invite those of his/her colleagues who have a similar age as himself/herself, the content to be transmitted is "May I invite you to a dinner?" At this time, since the content to be transmitted does not need to be transmitted to every colleague, the second filter unit should delete users, whose ages are far different from the user, from the third user set, obtain the final, second user set, and transmit the URL link to the second user set. The age information may be read from pre-recorded information.

Given that the content to be transmitted is an MMS (Multimedia Messaging Service) message, in which there is an audio file, sounds will be generated after the MMS message is received by the user. In general, if the scenario mode of the terminal currently used by the receiving user is the meeting mode, the transmitted message may disturb the receiving user, and the user may want to be not disturbed by such a message at present. Therefore, the second filter unit may delete users, the scenario mode of whose terminals is the meeting mode, from the third user set, obtain the final, second user set, and transmit the SMS message to the second user set.

Of course, the above examples are illustrative exemplifications only. In a specific embodiment of the present invention, users may be further deleted on the basis of other kinds of auxiliary information (such as, motion information of a terminal), so as to meet the user's requirements as much as possible while the amount of transmissions is reduced to lower the network load.

Figure 3:
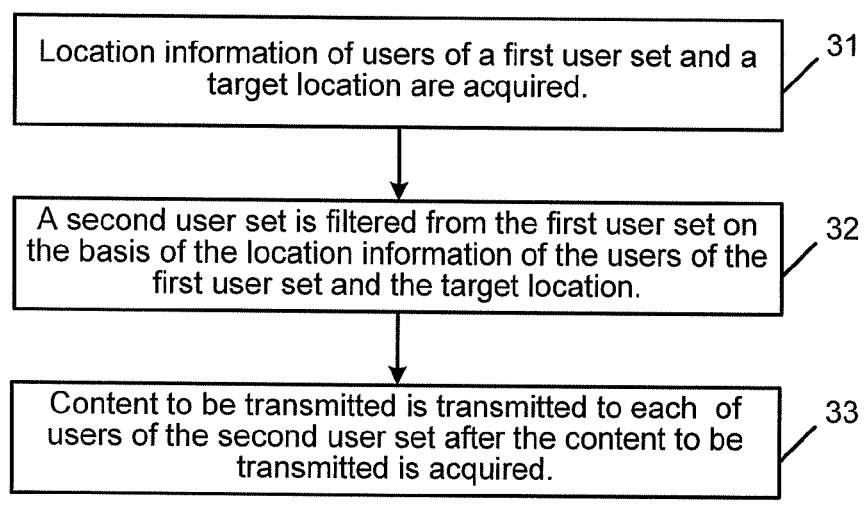
FIG. 3 is a flow chart illustrating a method according to an embodiment of the present invention.

FIG. 3 shows an information transmission processing method for a communication terminal according to an embodiment of the present invention, comprising:

at step 31, acquiring location information of users of a first user set and a target location;

at step 32, filtering a second user set from the first user set on the basis of the location information of the users of the first user set and the target location; and at step 33, transmitting content to be transmitted to each of users of the second user set after the content to be transmitted is acquired.

The target location is determined on the basis of operations on an electric map, or by searching in the electric map on the basis of input original location information, or by searching in the electric map on the basis of the content to be transmitted.

In the step 32, the second user set may be formed on the basis of the location information only, or on the basis of a combination of the location information and other auxiliary filter information. In the latter case, the step 33 further comprises:

filtering a third user set from the first user set, wherein location of users of the third user set and the target location have a predetermined location filter relation; and filtering the second user set from the third user set on the basis of auxiliary filter information of the users of the third user set which is different from the location information, wherein the auxiliary filter information of the users of the second user set meets a predetermined auxiliary filter condition.

The above description is the preferred implementation of the present invention only. What shall be noted is that, for one ordinarily skilled in the art, several improvements and retouches may be made without departing the principles of the present invention. Such improvements and retouches should be regarded as being covered by the scope of the present invention.

What is claimed is:

1. A communication terminal, comprising:
a communication processing module;
a location information acquisition module configured to acquire location information of users of a first user set;
a content acquisition module configured to acquire, from a user of the communication terminal, content to be transmitted to and rendered on communication terminals of receiving users;
a target location acquisition module configured to acquire a target location by using location information included in the content to be transmitted and rendered;
a filter module configured to filter a second user set from the first user set on the basis of the location information of the users of the first user set and the target location;

and
an information transmission module configured to transmit the content to be transmitted and rendered only to each of users of the second user set via the communication processing module.

2. The communication terminal according to claim 1, further comprising:
an electronic map presenting module configured to present an electronic map,
wherein the target location acquisition module is further configured to determine the target location on the basis of operations on the electronic map.

3. The communication terminal according to claim 1, further comprising:
an electronic map storage module configured to store an electronic map; and
an original location acquisition module configured to acquire original location information,
wherein the target location acquisition module is further configured to determine the target location by searching in the electronic map on the basis of the original location information.

4. The communication terminal according to claim 1, further comprising:
an electronic map storage module configured to store an electronic map,
wherein the target location acquisition module is further configured to determine the target location by searching in the electronic map on the basis of the content to be transmitted.

5. The communication terminal according to claim 1, wherein the target location is an expected area, and wherein location information of users of the second user set indicates that the users of the second user set are located within the expected area.

6. The communication terminal according to claim 1, wherein the target location is an expected area, and wherein location information of users of the second user set indicates that the users of the second user set are located outside of the expected area.

7. The communication terminal according to claim 1, wherein the information transmission module comprises:
a short message processing module configured to enclose the content to be transmitted into a short message, and transmit the short message to each of users of the second user set via the communication processing module; or
an instant message processing module configured to enclose the content to be transmitted into an instant message for an instant messenger, and transmit the instant message to each of users of the second user set via the communication processing module.

8. The communication terminal according to claim 1, wherein the filter module comprises:

a first filter unit configured to filter a third user set from the first user set, wherein locations of users of the third user set and the target location have a predetermined location filter relation; and
a second filter unit configured to filter the second user set from the third user set on the basis of auxiliary filter information of the users of the third user set which is different from the location information, wherein the auxiliary filter information of the users of the second user set meets a predetermined auxiliary filter condition.

9. An information transmission processing method for a communication terminal, comprising:
acquiring location information of users of a first user set;
acquiring, from a user of the communication terminal, content to be transmitted to and rendered on communication terminals of receiving users;
acquiring a target location by using location information included in the content to be transmitted and rendered;
filtering a second user set from the first user set on the basis of the location information of the users of the first user set and the target location; and
transmitting the content to be transmitted and rendered only to each of users of the second user set after the content to be transmitted is acquired.

10. The information transmission processing method according to claim 9, wherein the target location is determined on the basis of operations on an electronic map stored in the communication terminal.

11. The information transmission processing method according to claim 9, wherein the target location is acquired by searching in an electronic map stored in the communication terminal on the basis of input original location information.

12. The information transmission processing method according to claim 9, wherein the target location is acquired by searching in an electronic map stored in the communication terminal on the basis of the content to be transmitted.

13. The information transmission processing method according to claim 9, wherein the step of filtering a second user set from the first user set on the basis of the location information of the users of the first user set and the target location comprises steps of:
filtering a third user set from the first user set, wherein locations of users of the third user set and the target location have a predetermined location filter relation; and
filtering the second user set from the third user set on the basis of auxiliary filter information of the users of the third user set which is different from the location information, wherein the auxiliary filter information of the users of the second user set meets a predetermined auxiliary filter condition.

* * * * *